(12) United States Patent
Scott

(10) Patent No.: US 7,771,131 B2
(45) Date of Patent: Aug. 10, 2010

(54) CAMERA MOUNT

(76) Inventor: L. Dean Scott, 12170 Highway 63 South, Lucedale, MS (US) 39453

( * ) Notice: Subject to any disclaimer, the term of this patent is extended or adjusted under 35 U.S.C. 154(b) by 160 days.

(21) Appl. No.: 12/222,755

(22) Filed: Aug. 15, 2008

(65) Prior Publication Data

US 2010/0040360 A1     Feb. 18, 2010

(51) Int. Cl.
 *G03B 17/00* (2006.01)
(52) U.S. Cl. ............... 396/428; 348/373; 352/243; 248/176.3
(58) Field of Classification Search ......... 396/419, 396/423, 428; 224/185; 352/131, 243; 248/176.1, 248/176.3, 670; 348/373
See application file for complete search history.

(56) References Cited

U.S. PATENT DOCUMENTS

| | | |
|---|---|---|
| D363,945 S | 11/1995 | LaBree |
| 5,497,214 A | 3/1996 | Labree |
| 5,622,342 A | 4/1997 | Mills |
| 5,649,257 A | 7/1997 | Kempka |
| 5,723,808 A | 3/1998 | Devall |
| 6,478,272 B1 | 11/2002 | McKinsey et al. |
| 6,694,661 B1 | 2/2004 | Langford |
| 2006/0197001 A1 | 9/2006 | Parker et al. |
| 2009/0129769 A1* | 5/2009 | Broberg ............... 396/428 |

* cited by examiner

*Primary Examiner*—Melissa J Koval
*Assistant Examiner*—Autumn Parker
(74) *Attorney, Agent, or Firm*—Stephen R. Greiner

(57) ABSTRACT

A camera mount including an adjustable bracket for securement to a tree trunk. The bracket has a base portion for engaging a tree trunk. A carrier portion is pivotally fastened to the base portion for movement around a first horizontal axis. A pivot portion is pivotally fastened to the carrier portion for movement around a second horizontal axis being oriented at right angles to the first horizontal axis. A tree trunk-encircling belt extends through a passageway in the base portion. A hinged support arm extends outwardly from the bracket and is pivotally fastened to the pivot portion.

3 Claims, 4 Drawing Sheets

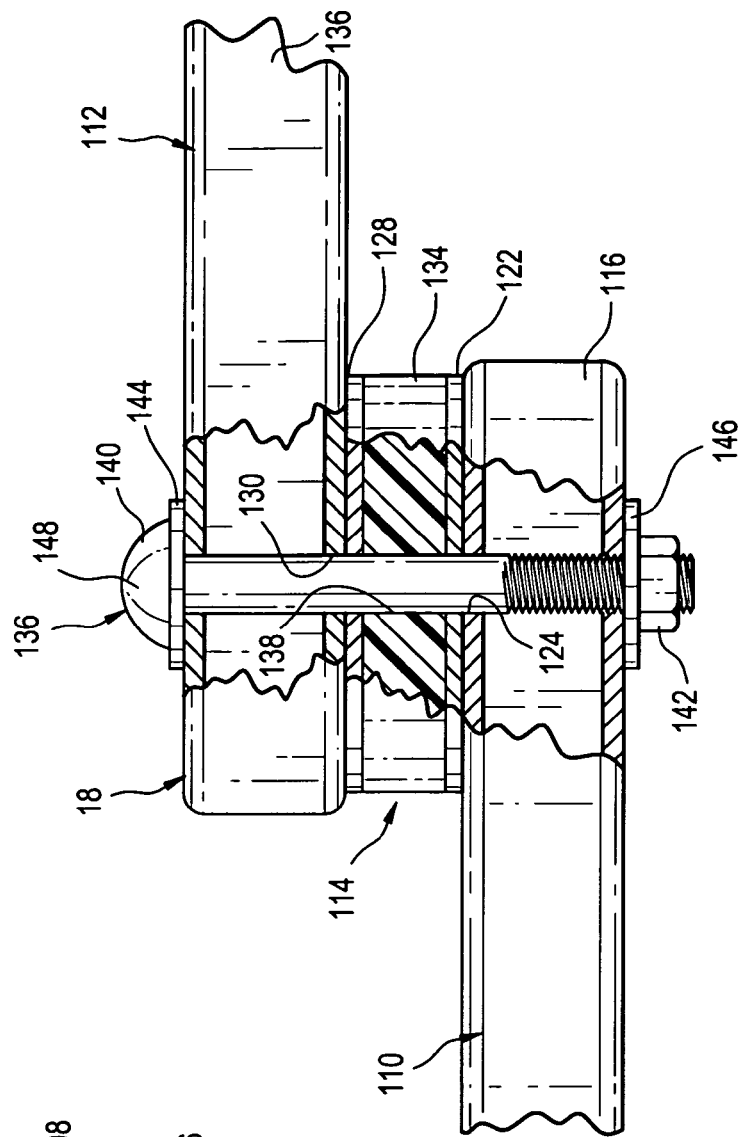
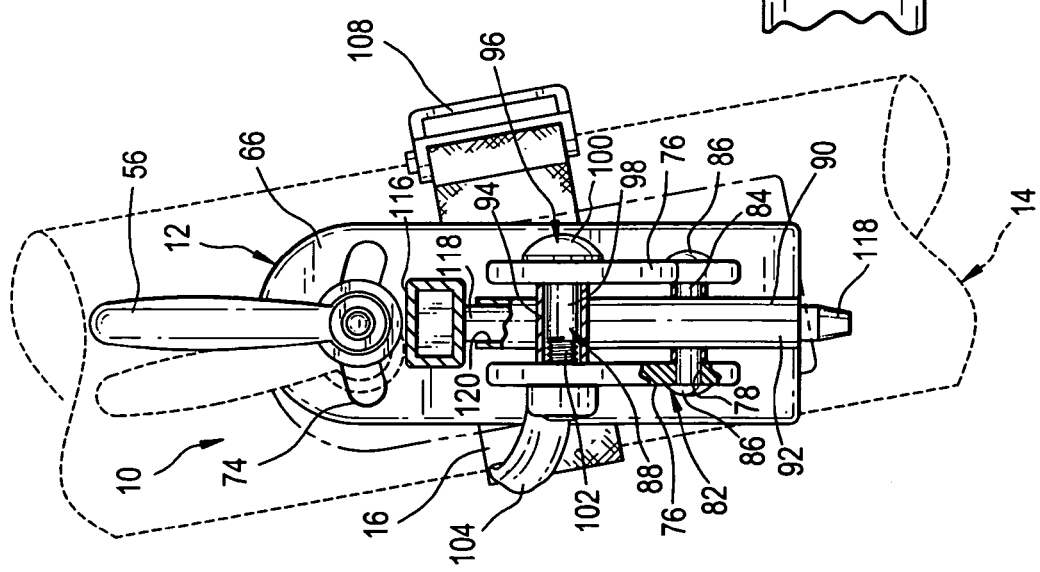

CAMERA MOUNT

FIELD OF THE INVENTION

The present invention relates generally to supports and, more particularly to support brackets that can be adjusted both vertically and horizontally.

BACKGROUND OF THE INVENTION

Capturing video images in wooded areas is not easy. Lighting conditions are tricky. Ticks and other insects are abundant. The presence of brush makes movement difficult. Uneven ground offers little support for camera tripods. In response to the last problem, devices for securing video cameras to trees have been proposed.

The proposed camera mounting devices seem flimsy. They are also difficult to use since they cannot be easily adjusted to support a video camera in a level manner. Also, the proposed devices lack the ability to pan the camera so as to follow moving targets. When the camera is improperly leveled and moved, it often captures skewed and unusable images.

SUMMARY OF THE INVENTION

In light of the problems associated with the known video camera mounting devices, it is a principal object of the invention to provide a camera mount for securing a video camera to a tree that can be easily adjusted to hold the camera in a level manner. Furthermore, the mount permits the leveled camera to be smoothly panned in, out, left and right from the supporting tree. Thus, the camera mount is infinitely adjustable over its large range of movement.

It is another object of the invention to provide a camera mount of the type described that partially wraps around the body of a user standing next to the supporting tree.

It is a further object of the invention to provide a camera mount that requires minimal training and no additional tools for deployment in the field.

It is an object of the invention to provide improved features and arrangements thereof in a camera mount for the purposes described which is lightweight in construction, inexpensive to manufacture, and dependable in use.

The foregoing and other objects, features, and advantages of the present invention will become readily apparent upon further review of the following detailed description of the camera mount as illustrated in the accompanying drawings.

BRIEF DESCRIPTION OF THE DRAWINGS

The present invention may be more readily described with reference to the accompanying drawings, in which:

FIG. 3 is a front view of the support bracket adjusted for use on a tree trunk that inclines to the left.

FIG. 4 is a cross-sectional view of the swing arm pivot assembly of the camera mount.

Similar reference characters denote corresponding features consistently throughout the accompanying drawings.

DETAILED DESCRIPTION OF THE PREFERRED EMBODIMENT

Figure 1:
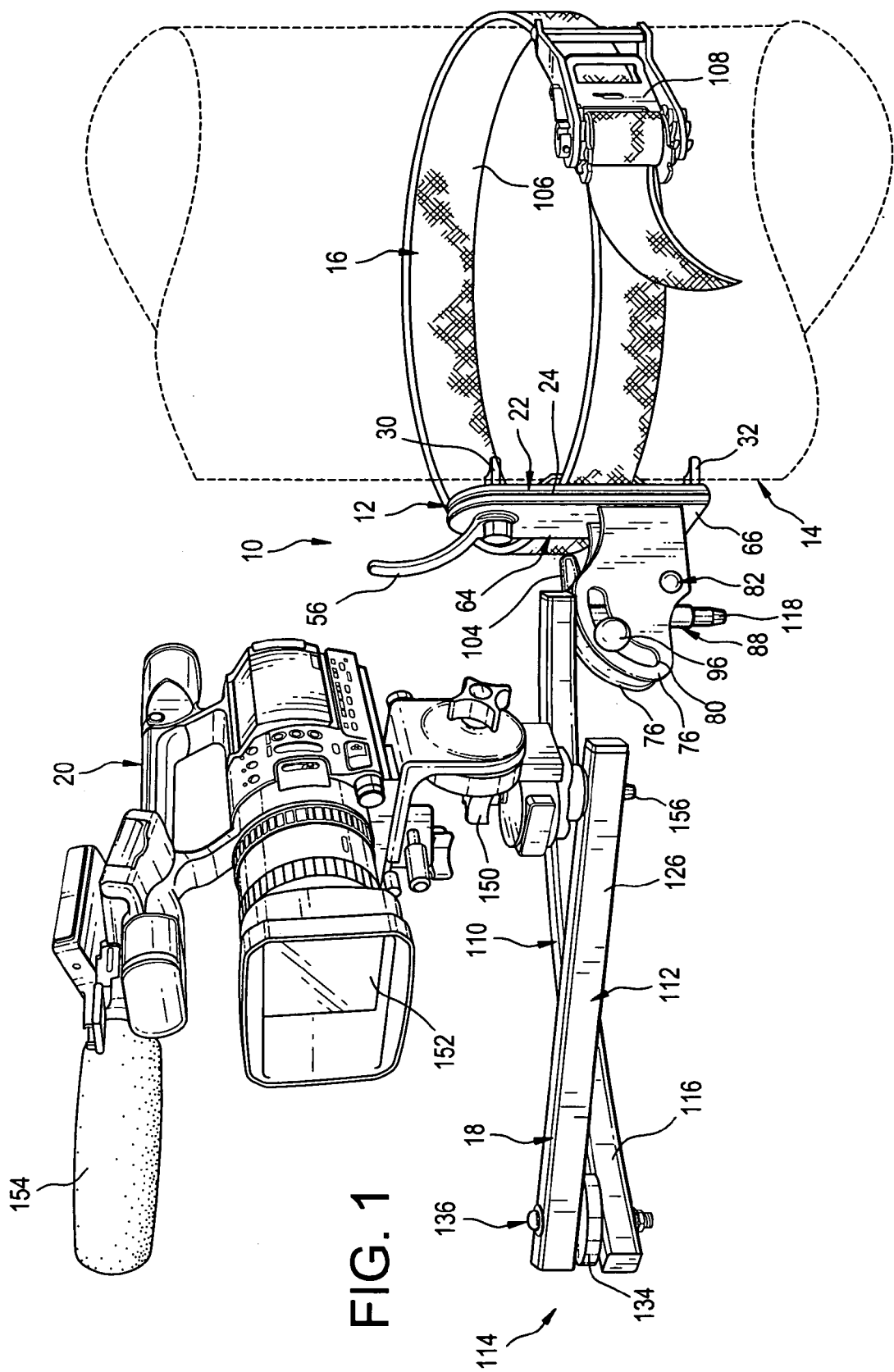
FIG. 1 is a perspective view of a camera mount in accordance with the present invention shown secured to a tree trunk and supporting a video camera.

Referring now to the FIGS., a camera mount in accordance with the present invention is shown at 10. Mount 10 includes an adjustable bracket 12 that is secured to a tree trunk 14 by a belt 16. A hinged boom arm 18 extends outwardly from bracket 12. A video camera 20 is affixed to arm 18 remote from bracket 12.

Bracket 12 has a base portion 22 that engages tree trunk 14. Base portion 22 includes a vertically elongated base plate 24 having a front face 26 and a rear face 28. A pair of jaws 30, 32 is affixed to rear face 28 with jaw 30 being located near the top of plate 24 and jaw 30 being located near the bottom of plate 24. Between jaws 30, 32, a retaining band 34 is affixed at the top and bottom thereof to rear face 28 so as to define a horizontal passageway 36 through which belt 16 is extended. A retaining pin 38 is affixed to front face 26 near the top of plate 24 and a pivot pin 40 is affixed to the middle of front face 26.

Each of jaws 30, 32 is a horizontal bar having opposed sides and a pair of teeth 42, 44 at each of the opposed sides. The outer teeth 42 are somewhat longer than the inner teeth 44 so as to firmly grip trunk 14 with a generally cylindrical shape. Inner teeth 44 are separated by a concavity 46 that can receive bulges and protuberances extending from trunk 14.

Retaining band 34 is C-shaped, including a retaining plate 48 and a pair of retaining tabs 50, 52 that project respectively forward from the top and bottom of retaining plate 48. Tabs 50, 52 are affixed at their free, front ends to base plate 24. Tabs 50, 52 separate retaining plate 48 from base plate 24 and establish passageway 36 with a width sufficient to accommodate belt 16.

Retaining pin 38 is oriented at right angles to base plate 24 and projects forwardly from base plate 24. Retaining pin 38 is provided with external helical threads 54 upon which is screwed a wing nut 56. So as to better distribute loads when wing nut 56 is tightened, a washer 58 is positioned on retaining pin 38 between wing nut 56 and base plate 24.

Pivot pin 40 has a shaft 60 and an enlarged head 62 on shaft 60. Shaft 60 is affixed at its rear end to base plate 24 and projects forwardly at right angles from base plate 24. Head 62 is affixed to the free, front end of shaft 60 a short distance from base plate 24.

Bracket 12 includes a carrier portion 64 that is pivotally fastened to base portion 22. Carrier portion 64 has a vertically elongated, shoulder plate 66 with a front side 68 and a rear side 70. As shown, rear side 70 of shoulder plate 66 abuts front face 26 of base plate 24. An aperture 72 proximate the center of shoulder plate 66 snugly, yet rotatably, accommodates shaft 60 projecting from base plate 24. Head 62, being larger in diameter than aperture 72, prevents the separation of base plate 24 and shoulder plate 66. An arcuate slot 74 extending from one side of shoulder plate 66 to the other is provided in the top of shoulder plate 66. Slot 74 follows the arc of a circle whose center coincides with the center of aperture 72.

Retaining pin 38 projects through slot 74 and forwardly from shoulder plate 66. Wing nut 56 and washer 58, having diameters that are greater than the width of slot 74, can, by tightened nut 56, clamp shoulder plate 66 against base plate 24. Thus, a user can selectively vary the angular orientation of shoulder plate 66 relative to base plate 24.

Carrier portion 64 has a pair of support arms 76 that projects forwardly from shoulder plate 66. Arms 76 are affixed at their rear ends to front side 68 of shoulder plate 66 on opposite sides of aperture 72 and pivot pin 40. A bore 78 is provided in each of arms 78 near the bottom thereof and approximately midway between the rear end and the front end thereof. Located above each bore 78 and forward of each bore 78 is an arcuate slot 80. Slot 80 follows the arc of a circle whose center coincides with the center of bore 78.

Carrier portion 64 has a pivot pin 82 that extends between arms 76. Pivot pin 82 has a shaft 84 with opposite ends that extend through bores 78. A pair of enlarged heads 86 is affixed to shaft 84 with one of heads 86 being positioned at each of the opposite ends of shaft 84. Since heads 86 are larger in diameter than bores 78, shaft 84 cannot be pulled from arms 76. Thus, pivot pin 82 is effectively fastened to arms 76.

Bracket 12 has a pivot portion 88 that is pivotally fastened to carrier portion 64. Pivot portion 88 includes a retaining tube or sleeve 90 that is rotatably fitted upon shaft 84 of pivot pin 82 between arms 76. A socket member 92 is affixed at its bottom end to the center of retaining sleeve 90 and has a top end that extends between slots 80 in arms 76. (Socket member 92 has a length that is substantially equal to the diameter of the circle that defines the arc of slots 80.) The middle of a clamping tube or sleeve 94 is affixed to the top of socket member 92. Clamping sleeve 94 extends between arms 76 and is substantially parallel to retaining sleeve 90. Also, clamping sleeve 94 has a diameter that is larger than the width of slot 80.

Pivot portion 88 has a clamping pin 96 that extends through clamping sleeve 94. Clamping pin 96 has a shaft 98 that extends through clamping sleeve 94 such that its opposed ends project outwardly from slots 80. An enlarged head 100 is affixed to one of the opposed ends of shaft 98 and is positioned adjacent one of arms 76. Head 100 is larger in diameter than the adjacent slot 80 is wide so that head 100 cannot be pulled through the adjacent slot 80. The opposed end of shaft 98 remote from head 100 is provided with external, helical threads 102 upon which a wing nut 104 is screwed. Wing nut 104 is larger in diameter than the adjacent slot 80 is wide and, thus, cannot be pulled through the adjacent slot 80. By rotating wing nut 104 on threads 102, head 100 and wing nut 104 are drawn together to clamp arms 76 against clamping sleeve 94 and fix the angular orientation of socket member 92 relative to carrier portion 64.

Belt 16 includes a webbing strip 106 having a ratchet-type winder 108 affixed to one of the ends of the webbing strip 106. Strip 106 is sized for easy extension through passageway 36 and has a length sufficient to extend around a typical tree trunk as at 14. Strip 106 is also formed from durable materials, having strength adequate to support the weight of mount 10 and camera 20 on trunk 14. By ratcheting winder 108 in the usual way, the free end of strip 106 is reeled in to pull strip 106 tight against trunk 14.

Boom arm 18 has an inner arm segment 110 and an outer arm segment 112 connected together by a bushing assembly 114. Inner arm segment 110 pivots freely relative to socket member 92, and outer arm segment 112 pivots freely relative to inner arm segment 110. Thus, a user of mount 10 is afforded substantial freedom in the positioning of camera 20 while making a movie.

Inner arm segment 110 includes an elongated member 116 having a square cross section and suitable dimensions. When viewed from above, member 116 is seen to be curved to one side to conform to the contour of the body of a user who may be positioned between trunk 14 and inner arm segment 110 during the use of mount 10. A pivot rod 118, adapted for insertion into the socket 120 provided at the center of socket member 92, is affixed to, and extends downwardly from the inner end of member 116. A bearing plate 122 is affixed to the top of member 116 at the outer end thereof. A pivot hole 124 extends vertically through member 116 and plate 122.

Outer arm segment 112 includes an elongated member 126 having a square cross section and suitable dimensions. When viewed from above, member 126 is seen to be linear. A bearing plate 128, having the same size as bearing plate 122, is affixed to the bottom of member 126 at the inner end thereof. A pivot hole 130 extends vertically through the inner end of member 126 and the center of bearing plate 128. A camera attachment hole 132 extends vertically through the outer end of member 126.

Bushing assembly 114 is provided at the connection of arm segments 110 and 112. Assembly 114 includes a bushing 134 sandwiched between bearing plates 112 and 128 and a threaded fastener 136 that extends through bushing 134 to connect arm segments 110 and 112 together. As shown, bushing 134 is a thick plastic disk having an outer diameter that is the same as that of bearing plates 122 and 128. Bushing 134 has a pivot hole 138 at its center through which fastener 136 is extended. Fastener 136 is a bolt 140 that passes vertically downward through holes 124, 130 and 138, and a nut 142 that is screwed onto the bottom of bolt 140. Washers 144 and 146 are provided beneath the head 148 of bolt 140 and atop nut 142 to permit arm segments 110 and 112 to pivot freely relative to one another.

Video camera 20 is attached to the outer, free end of arm 18 by means of an attachment fixture 150 located at the bottom of camera 20 that permits camera 20 to be moved relative to arm 18 about three axes. Camera 20 is digital in type and conventional in construction. Camera 20 has a lens 152 for gathering light and a microphone 154 for capturing sound. Light passing through lens 152 contacts an imager (not shown) that converts the incident light into an electronic video signal which is delivered to a recorder (not shown) for storage and subsequent playback. Microphone 154 is an acoustic-to-electric transducer that converts sound into an electronic signal that is delivered to the recorder for simultaneous playback with the video signal.

Figure 2:
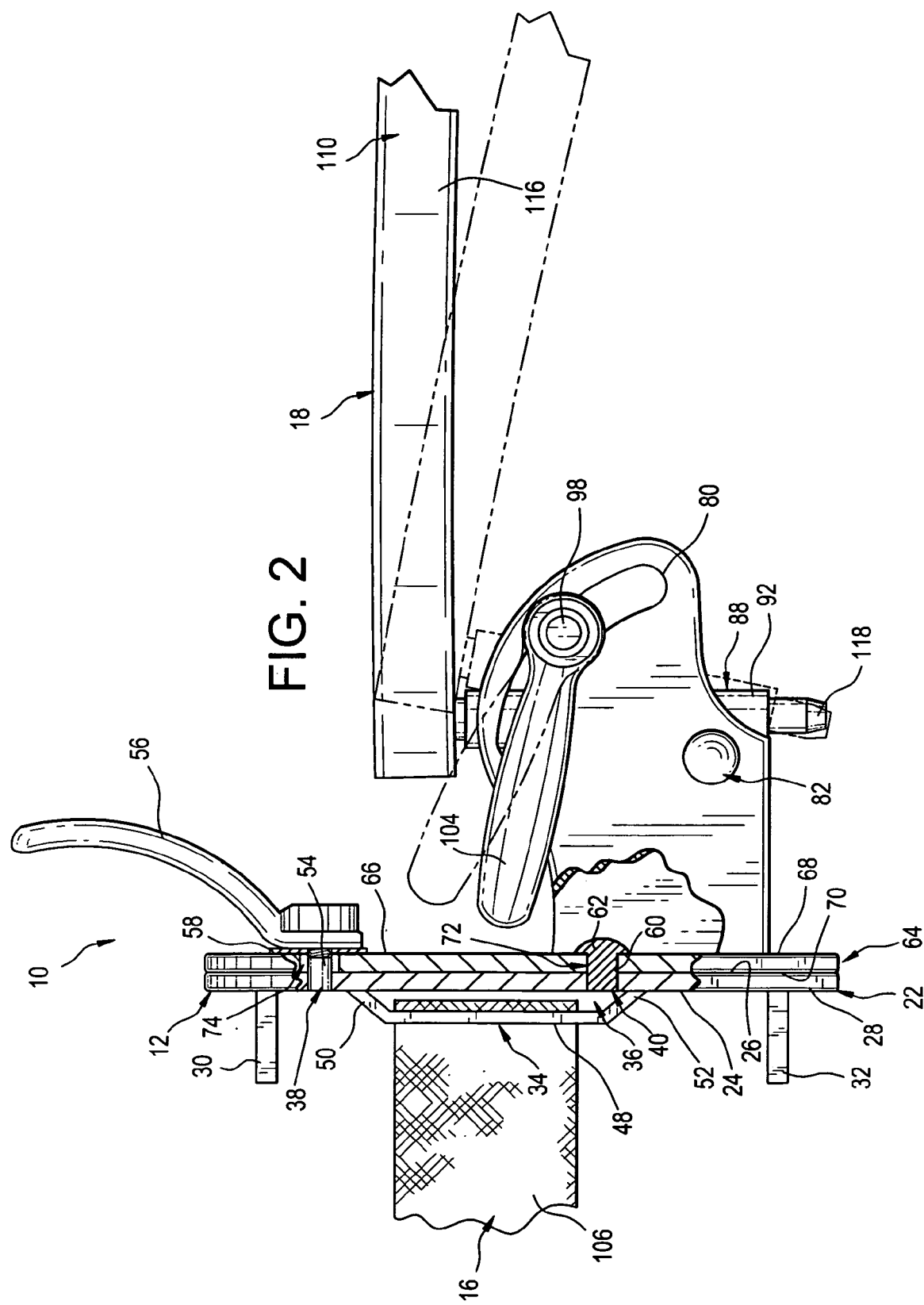
FIG. 2 is a side view of the support bracket of the camera mount with portions broken away to reveal details thereof.
Figure 5:
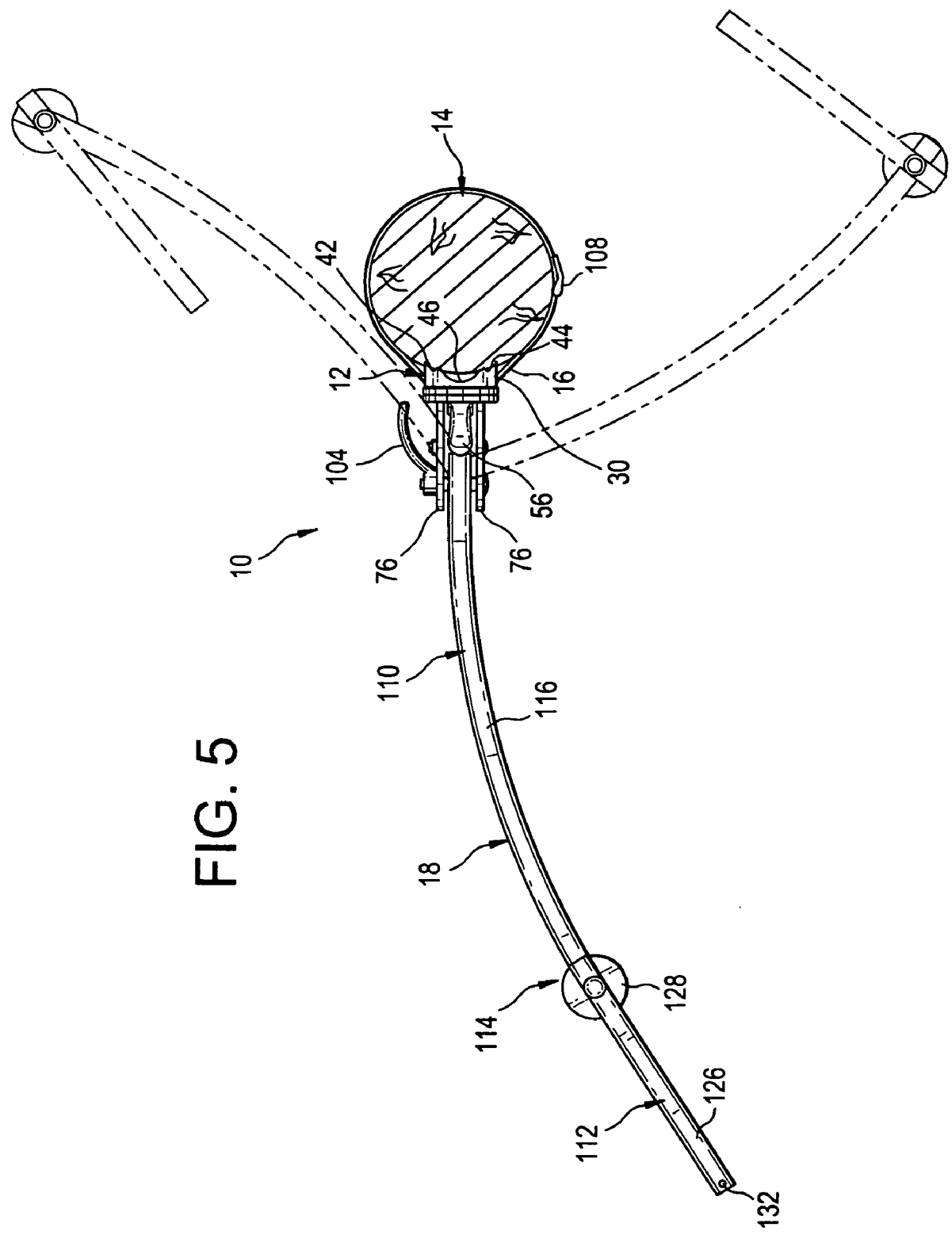
FIG. 5 is a top view of the camera mount showing the range of motion of the swing arm.

The use of camera mount 10 is straightforward. First, webbing strip 106 is wrapped around tree trunk 14, extended through passageway 36 and ratcheted tight with winder 108 so as to secure bracket 12 to tree trunk 14 at a convenient height. Next, assuming that trunk 14 inclines to the left like the one shown in FIG. 4, shoulder plate 66 is vertically oriented by: loosening wing nut 56, making the necessary adjustment, and retightening wing nut 56. Now, assuming that trunk 14 tilts rearwardly (to the left in FIG. 2), socket member 92 is vertically oriented by: loosening wing nut 104, making the adjustment necessary to bring arm 18 to level (the broken line position in FIG. 2), and retightening wing nut 104. Afterward, camera 20 is attached to the outer end of arm 18 by extending a threaded fastener 156 through attachment hole 132 into camera fixture 150. Once camera 20 is energized, arm segments 110 and 112 can be moved about to easily, comfortably and stably point camera 20 in practically any direction. Only a few minutes are required to set up camera 20 on mount 10.

Taking down mount 10, when the shooting of videos with camera 20 is completed, requires less time than setting it up. Camera 20 need only be disconnected from arm 18, with a quick-release feature associated with fixture 150 facilitating this and, then, mount 10 can be removed from tree trunk 14 by reversing the steps outlined in the previous paragraph. After the various parts of mount 10 are folded upon one another, mount 10 can be transported and stored in a compact state. Mount 10 remains always ready for immediate reuse.

While camera mount 10 has been described with a high degree of particularity, it will be appreciated by those skilled in the art that some modifications can be made to it. Therefore, it is to be understood that the present invention is not limited to mount 10, but encompasses any and all camera mounts within the scope of the following claims.

I claim:

1. A camera mount, comprising:
    an adjustable bracket for securement to a tree trunk, said bracket including:
        a base portion for engaging a tree trunk, said base portion including:
            a base plate having a front face and a rear face;
            a pair of jaws being affixed to said base plate in a spaced-apart relationship so as to project rearwardly from said rear face;
            a retaining band being affixed to said base plate so as to project rearwardly from said rear face and to define a horizontal passageway;
            a retaining pin being affixed to said base plate and projecting forwardly from said front face, and said retaining pin having first, external, helical threads;
            a first pivot pin being affixed to said base plate so as to project forwardly from said front face remote from said retaining pin; and,
            a first wing nut being threadably engaged with said first, external, helical threads of said retaining pin;
        a carrier portion being pivotally fastened to said base portion, said carrier portion including:
            a shoulder plate having a front side and a rear side and said rear side abutting said front face of said base plate, said shoulder plate also having an aperture for rotatably receiving said first pivot pin and a first arcuate slot for slidably receiving said retaining pin;
            a pair of support arms being affixed to, and projecting forwardly from, said front side of said shoulder plate, each of said support arms being provided with a second arcuate slot; and,
            a second pivot pin having opposite ends, said opposite ends being respectively affixed to said support arms remote from said second arcuate slots;
        a pivot portion being pivotally fastened to said carrier portion, said pivot portion including:
            a retaining sleeve being rotatably fitted upon said second pivot pin;
            a socket member having a socket therein, said socket member being affixed at the bottom thereof to said retaining sleeve;
            a clamping sleeve being affixed to the top of said socket member, said clamping sleeve being substantially parallel to said retaining sleeve;
            a clamping pin that extending through said clamping sleeve and said second arcuate slots in said support arms, said clamping pin having second, external, helical threads; and,
            a second wing nut being threadably engaged with said second, external, helical threads of said clamping pin;
    a tree trunk-encircling belt extending through said horizontal passageway of said base portion; and,
    a hinged boom arm extending outwardly from said bracket, said support arm including:
        an inner arm segment being pivotally fastened to said bracket, said inner arm segment having a first elongated member with a first inner end and a first outer end and a pivot rod being rotatably positioned within said socket in said socket member; and,
        an outer arm segment having a second inner end and a second outer end and being pivotally fastened at said second inner end thereof to said first outer end of said inner arm member.

2. The camera mount according to claim 1 wherein said first elongated member curves along the length thereof to one side.

3. The camera mount according to claim 1 wherein said inner arm segment includes a first bearing plate being affixed to the top of said first elongated member at said first outer end thereof and said outer arm segment includes a second bearing plate being affixed to the bottom of said second elongated member at said inner end thereof and said camera mount further comprises a bushing positioned between said first bearing plate and said second bearing plate.

* * * * *